(12) United States Patent
Hershey et al.

(10) Patent No.: US 11,488,047 B2
(45) Date of Patent: Nov. 1, 2022

(54) AUTONOMOUS CORRECTION OF COURSE OF ACTION

(71) Applicant: Raytheon Company, Waltham, MA (US)

(72) Inventors: Paul C. Hershey, Ashburn, VA (US); Michael P. Sica, Oak Hill, VA (US); Danielle J. Marchione, Vienna, VA (US); Marilyn W. Zett, Vienna, VA (US)

(73) Assignee: Raytheon Company, Waltham, MA (US)

( * ) Notice: Subject to any disclaimer, the term of this patent is extended or adjusted under 35 U.S.C. 154(b) by 282 days.

(21) Appl. No.: 16/856,501

(22) Filed: Apr. 23, 2020

(65) Prior Publication Data
US 2021/0334687 A1    Oct. 28, 2021

(51) Int. Cl.
| | | |
|---|---|---|
| *G06N 7/08* | (2006.01) | |
| *G05D 1/00* | (2006.01) | |
| *G06F 17/18* | (2006.01) | |
| *G06K 9/62* | (2022.01) | |
| *G06N 7/00* | (2006.01) | |
| *G06N 20/00* | (2019.01) | |

(52) U.S. Cl.
CPC ............. *G06N 7/08* (2013.01); *G05D 1/0088* (2013.01); *G06F 17/18* (2013.01); *G06K 9/6215* (2013.01); *G06K 9/6282* (2013.01)

(58) Field of Classification Search
None
See application file for complete search history.

(56) References Cited

U.S. PATENT DOCUMENTS

| | | | |
|---|---|---|---|
| 11,119,477 B1* | 9/2021 | Konrardy | B60W 30/18163 |
| 2007/0021879 A1* | 1/2007 | DelNero | G05D 1/0088 |
| | | | 701/1 |
| 2016/0086494 A1* | 3/2016 | Anandayuvaraj | G08G 5/0056 |
| | | | 701/3 |
| 2016/0253590 A1* | 9/2016 | Hershey | F41H 11/00 |
| | | | 706/14 |
| 2016/0299505 A1* | 10/2016 | Ohara | B25J 11/0005 |
| 2017/0123422 A1* | 5/2017 | Kentley | B60L 15/20 |
| 2020/0311583 A1* | 10/2020 | Manamohan | H04L 9/0637 |

FOREIGN PATENT DOCUMENTS

| | | | | |
|---|---|---|---|---|
| WO | WO-2017079222 A1 * | 5/2017 | | B60L 15/20 |
| WO | WO-2018224872 A1 * | 12/2018 | | G08G 1/0112 |
| WO | WO-2019070790 A1 * | 4/2019 | | G06F 30/15 |

* cited by examiner

*Primary Examiner* — Mohammed Rachedine
(74) *Attorney, Agent, or Firm* — Schwegman Lundberg & Woessner, P.A.

(57) ABSTRACT

Discussed herein are devices, systems, and methods for autonomous, dynamic course of action (COA) generation and management. A method can include issuing a communication to one or more assets indicating operations of a first COA to be performed, receiving, by an intelligence, surveillance, and reconnaissance (ISR) device, data indicating an unexpected event, not accounted for in the first COA, has occurred, in response to the data indicating the unexpected event, identifying a second COA or a portion of a second COA that satisfies a mission of the first COA and accounts for the unexpected event, and issuing a second communication to the one or more assets indicating one or more operations of the second COA to be performed.

20 Claims, 8 Drawing Sheets

| VULNERABILITY TECHNIQUE PAIRS | MFGR/PROD | | | TEST | | | FIELD | | | BOOST | | |
|---|---|---|---|---|---|---|---|---|---|---|---|---|
| | VULN. #1 | VULN. #2 | ... | VULN. #3 | VULN. #4 | ... | VULN. #5 | VULN. #6 | ... | VULN. #7 | VULN. #8 | ... |
| TECHNIQUE #1 | ● | | | | | | ● | | | | | |
| TECHNIQUE. #2 | | | | | ● | | | | | | | |
| TECHNIQUE. #3 | | ● | | | | | | | | | | |
| TECHNIQUE. #4 | | | | ● | | | | | | | | |
| TECHNIQUE. #5 | | | | | | | | | | | | |
| TECHNIQUE. #6 | | ● | | | | | ● | | | | | |
| TECHNIQUE. #7 | | | | | | | | | | | | |
| TECHNIQUE. #8 | | | | | ● | | | | | | | |
| TECHNIQUE. #9 | | | | | | | | | | | | |
| TECHNIQUE. #10 | ● | | | | ● | | ● | | | | | |
| TECHNIQUE. #11 | | | | | | | | ● | | | | |
| TECHNIQUE. #12 | | | | | | | | | | ● | | |
| TECHNIQUE. #13 | | | | | | | | | | | ● | |
| TECHNIQUE. #14 | | | | | | | | ● | | | | |
| TECHNIQUE. #15 | | | | | | | | | | | ● | |
| TECHNIQUE. #16 | | | | | | | | ● | | | | |
| TECHNIQUE. #17 | | | | | | | | | | ● | | |
| TECHNIQUE. #18 | ● | | | | | | ● | | | | | |
| TECHNIQUE. #19 | | | | | | | | | | | ● | |
| TECHNIQUE. #20 | | | | | | | | | | | ● | |

*FIG. 5*

AUTONOMOUS CORRECTION OF COURSE OF ACTION

TECHNICAL FIELD

Embodiments discussed herein regard devices, systems, and methods for correcting a course of action (COA) after deployment. The COA can be implemented using one or more autonomous devices.

BACKGROUND

The United States (US) Department of Defense (DOD) has a well-defined process for COA generation. This is available in Joint Publication 5-0, Joint Planning, 16 Jun. 2017 (herein "Joint Publication"). The process defined by the DOD does not include a real-time update to the COA, such as when the COA is being executed.

BRIEF DESCRIPTION OF THE DRAWINGS

FIG. 5 illustrates, by way of example, a diagram of a chart of vulnerability-technique (VT) pairs as can be generated in accordance with some embodiments.

DETAILED DESCRIPTION

Embodiments provide methods, systems, devices, and computer-readable media for dynamically assessing the success of and for continuously updating a COA in real-time, during mission execution. Processes implemented by embodiments are sometimes called a Self-Healing Course of Action (COA) Revision (SCOAR). The Joint Publication defines COA as:

a. Any sequence of activities that an individual or unit may follow, or b. A scheme developed to accomplish a mission.

The individual or unit can include one or more people, autonomous devices, semi-autonomous devices, weapons, vehicles, or other assets. As discussed in the Background, the Joint Publication does not provide for the ability to adjust a COA after mission deployment. To adjust a COA based on the Joint Publication, one would go back through the COA planning, feasibility assessment and analysis, and COA generation. This plan in the Joint Publication does not allow for altering a COA based on dynamic changes in mission events.

Embodiments provide for dynamic adjustment to changes through iterative and continuous assessment of COA activities during mission execution. A change can include, for example, if a primary asset used for a given COA activity suffered attrition or was unable to complete its goal during an executing mission. A next best, like asset can be assigned the role of the asset that suffered the attrition. In this case, the COA activity does not change and no additional COA assessment is required. If no like assets are available, however, then embodiments can dynamically assess whether a new COA activity, not part of the original COA, could cover that portion of the COA.

Figure 1:
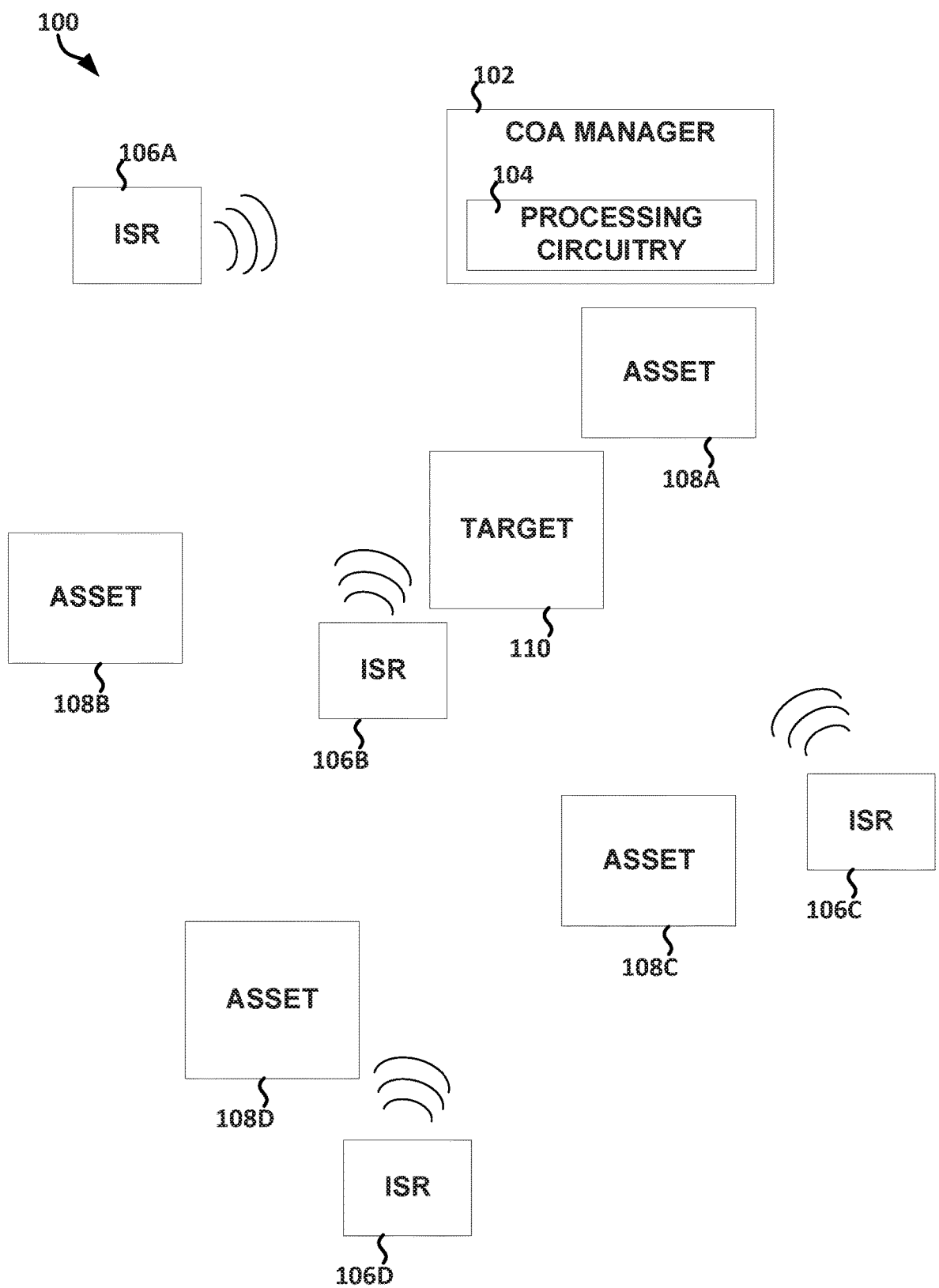
FIG. 1 illustrates, by way of example, a logical block diagram of an embodiment of a system for autonomous, dynamic COA management.

FIG. 1 illustrates, by way of example, a logical block diagram of an embodiment of a system 100 for autonomous, dynamic COA management. The system 100 as illustrated includes a COA manager 102, intelligence, surveillance, and reconnaissance (ISR) devices 106A, 106B, 106C, 106D, assets 108A, 108B, 108C, 108D, and a target 110. The COA manager 102 includes the device or devices responsible for the autonomous, dynamic COA adjusting. The COA manager 102 receives data from the ISR devices 106A-106D. The received data provides the COA manager 102 the information needed to determine which COA (or portion of a COA) is best for the current situation.

The COA manager 102 as illustrated includes processing circuitry 104. The processing circuitry 104 can include electric or electronic components configured to implement operations of the COA manager 102. The electric or electronic components can include one or more transistors, resistors, diodes, capacitors, inductors, oscillators, logic gates (e.g., AND, OR, XOR, negate, buffer, or the like), switches, multiplexers, amplifiers, power supplies, regulators, converters (e.g., analog to digital or digital to analog converters, or the like), processors (e.g., application specific integrated circuits (ASIC), field programmable gate arrays (FPGA), graphics processing units (GPU), central processing unit (CPU), or the like), radios (e.g., receive, transmit, or transceiver radio), antennas, modulators, demodulators, phase locked loops, or the like.

The ISR device 106A-106D collects and/or operates on ISR data. ISR is an integrated intelligence and operations function that can be defined as a coordinated acquisition, processing, and provision of accurate, relevant, timely information and intelligence to support a decision making process. The ISR devices 106A-106D can be land, sea, air, or space devices. Some examples of data acquired or analyzed by the ISR device 106A-106D include optical, radar, or infrared images, and electronic signals (sometimes called signal intelligence (SIGINT)). The ISR device 106A-106D can be a satellite, manned aircraft, unmanned aircraft, an aircraft system, or specialized ground, sea, or space-based equipment, or human intelligence teams. Accurate ISR data can help ensure quality intelligence about the target 110 to enhance the effectiveness of military operations.

The assets 108A-108D are the entities managed by the COA. The assets 108A-108D have a mission associated with the target 110. The mission has individual steps defined in the COA. The assets 108A-108D can include a person, manned vehicle, unmanned vehicle, or the like. The assets 108A-108D can operate together to affect the target 110. The assets 108A-108D can have a goal of destroying the target 110, reducing the functionality of the target 110, capturing the target 110, or the like. The target 110 can include a person, manned or unmanned vehicle, device, structure, or the like.

The COA manager 102 can communicate, via the processing circuitry 104, the COA to the assets 108A-108D. The assets 108A-108D can include circuitry configured to receive COA operations from the COA manager 102, such as an antenna, radio, or other processing circuitry.

The COA manager 102 can analyze the data from the ISR device 106A-106D to determine whether an action has affected an asset 108A-108D or the mission, such that a different COA can better handle the mission. The ISR device 106A-106D or the COA manager 102 can analyze the data from the ISR device 106A-106D to determine whether that data indicates a circumstance not handled by the current COA. In response, the COA manager 102 can perform an analysis that identifies a COA that better handles the mission. In response, the ISR device 106A-106D can provide a communication to the COA manager 102 indicating the circumstance not handled by the COA.

The COA manager 102 can implement a Markov Decision Process (MDP) to generate a COA tree (or identify a pre-computed COA tree). The COA manager 102 can implement a stochastic mathematical model (SMM) to determine probabilities and confidence intervals associated with transitioning between nodes of the COA tree. The nodes of the COA tree can represent assets and operations to be performed by the assets. More details regarding the COA tree are provided elsewhere herein.

The confidence interval computation can be different from that of the probability of success. Embodiments can propagate the probability of success and confidence interval using a priori knowledge of each confidence interval in the computation of the next confidence interval. This helps ensure that the next confidence interval benefits from the information in the prior confidence interval, thereby helping ensure that the final confidence interval for the generated COA accurately reflects confidence of the entire COA generation process.

Figure 2:
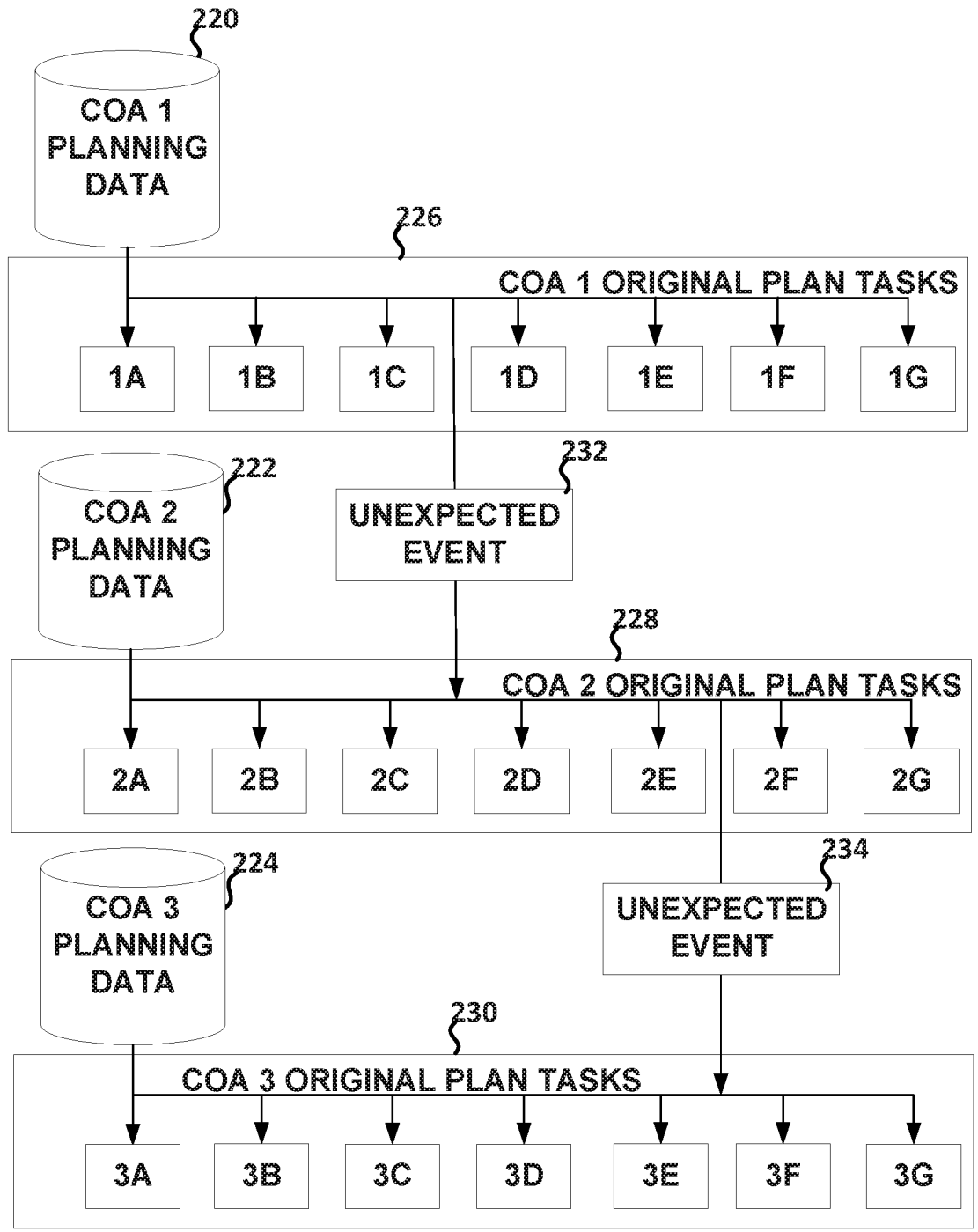
FIG. 2 illustrates, by way of example, a logical flow diagram of an embodiment of dynamic, autonomous COA alteration.

FIG. 2 illustrates, by way of example, a logical flow diagram of an embodiment of dynamic, autonomous COA alteration. One or more database 220, 222, 224, or other memory devices, store COA data. The COA data defines the COA tree of operations, probabilities, and confidence intervals for a specified COA. The plan operations 226, 228, 230 are the operations to be performed, as determined based on the COA tree.

The COA alteration begins with implementation of a COA. In the illustrated example, an operation 1A of COA 1 is performed. This is performed successfully and is followed by more operations of COA 1. After operation 1C an unexpected event 232 occurs. The unexpected event 232 is an event that is not managed by the COA 1. The unexpected event 232 can include an arrival of an entity adverse to the asset 108A-108D, damage to an asset 108A-108D, the asset 108A-108D otherwise losing functionality, or the like, that is not handled by the COA 1 plan operations 226.

While this description regards altering COA operations based on unexpected events, a COA can be altered or revised if a probability of success or confidence interval becomes insufficient to proceed with the COA. Insufficient in this context means the probability of success is too low (below a threshold), the confidence interval is too large (above a specified threshold), or a combination thereof.

In response to the unexpected event 232, the COA manager 102 can jump to a different COA (part way into the COA or at the beginning of the COA) or generate a new COA that handles the unexpected event 232 and still accomplishes the mission. Before the COA manager 102 implements a different COA, the COA manager 102 can update the probabilities of the current COA plan operations 226 based on the unexpected event 232. If the probability of success is above a threshold probability and with a confidence interval that is sufficiently narrow, the COA manager 102 can maintain the current COA. The threshold probability and confidence interval can be such that a lowest probability of success, determined based on the probability and the confidence interval, remains above a threshold probability.

In response to the unexpected event 232, the COA manager 102 issues commands to the assets 108A-108D that cause one or more of the assets 108A-108D to change operations. In the example of FIG. 2, the commands are for performing COA 2 plan operations 228. In the example of FIG. 2, the COA plan operations 228 begin with operation 2D and continue until a next unexpected event 234. The unexpected event 234 can be detected by the ISR device 106A-106D and communicated to the COA manager 102. The COA manager 102 can determine that the COA 2 is not sufficient to handle the unexpected event 234 and remain successful. The COA manager 102 can change the COA to a COA that handles the unexpected event 234 and still fulfills the mission.

Issuing a command can include sending/transmitting a command (e.g., over the air or via a wired interface) to the asset 108. In other cases, issuing can include generating and displaying the command (e.g., for specified personnel to see and take a subsequent action for getting the COA communicated/implemented (but not necessarily requiring transmission)).

In some embodiments, the COA manager 102 can determine that an equation that represents the COA does not include a variable that represents the unexpected event 232, 234. In such circumstances, the COA manager 102 can conclude that the current COA is insufficient to satisfy the mission. The new COA can be represented by an equation that includes a variable that represents the unexpected event 232, 234.

The COA planning data in the COA planning database 220, 222, 224, including the COA tree and corresponding edge probabilities can be determined in advance. The COA planning data 220, 222, 224, may not be readily available for some unexpected event(s). In such instances, the COA manager 102 can identify an equation representing the unexpected event, generate the COA tree, and determine the corresponding probabilities.

Figure 3:
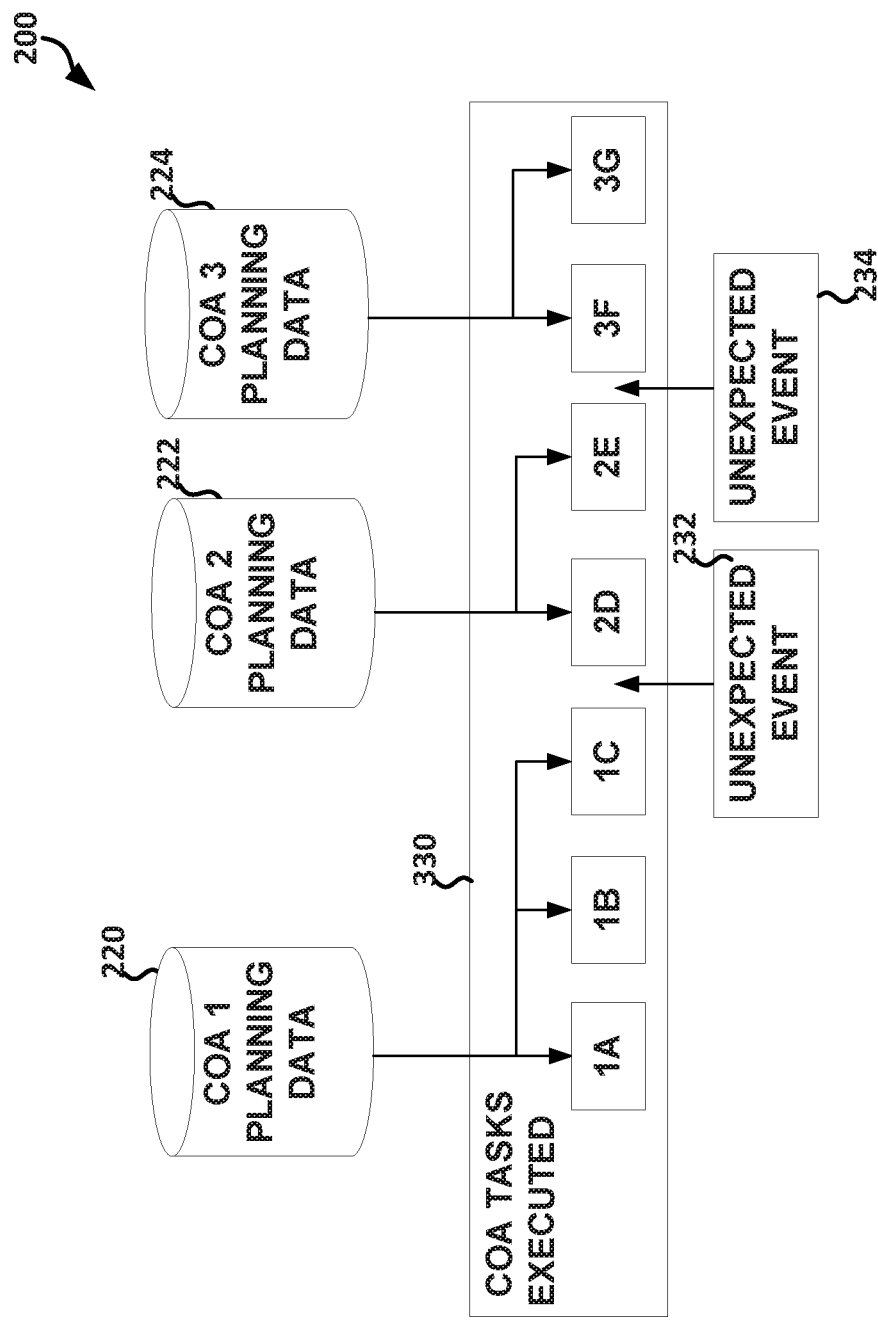
FIG. 3 illustrates, by way of example, a diagram of an embodiment of the actual COA plan operations executed in the example of FIG. 2.

FIG. 3 illustrates, by way of example, a diagram of an embodiment of the actual COA plan operations 330 executed in the example of FIG. 2. The COA 1 plan operations, 1A, 1B, 1C, are executed until the unexpected event 232 causes COA 1 to be insufficient to satisfy the mission. Then COA 2 is identified as being sufficient to satisfy the mission and the unexpected event 232. The COA 2 plan operations 2D, 2E, are then executed until the unexpected event 234 causes COA 2 to be insufficient to satisfy the mission and the unexpected event 232. The COA 3 is identified as being sufficient to satisfy the mission and unexpected events 232, 234. The COA 3 plan operations 3F, 3G are then executed for mission completion.

Figure 4:
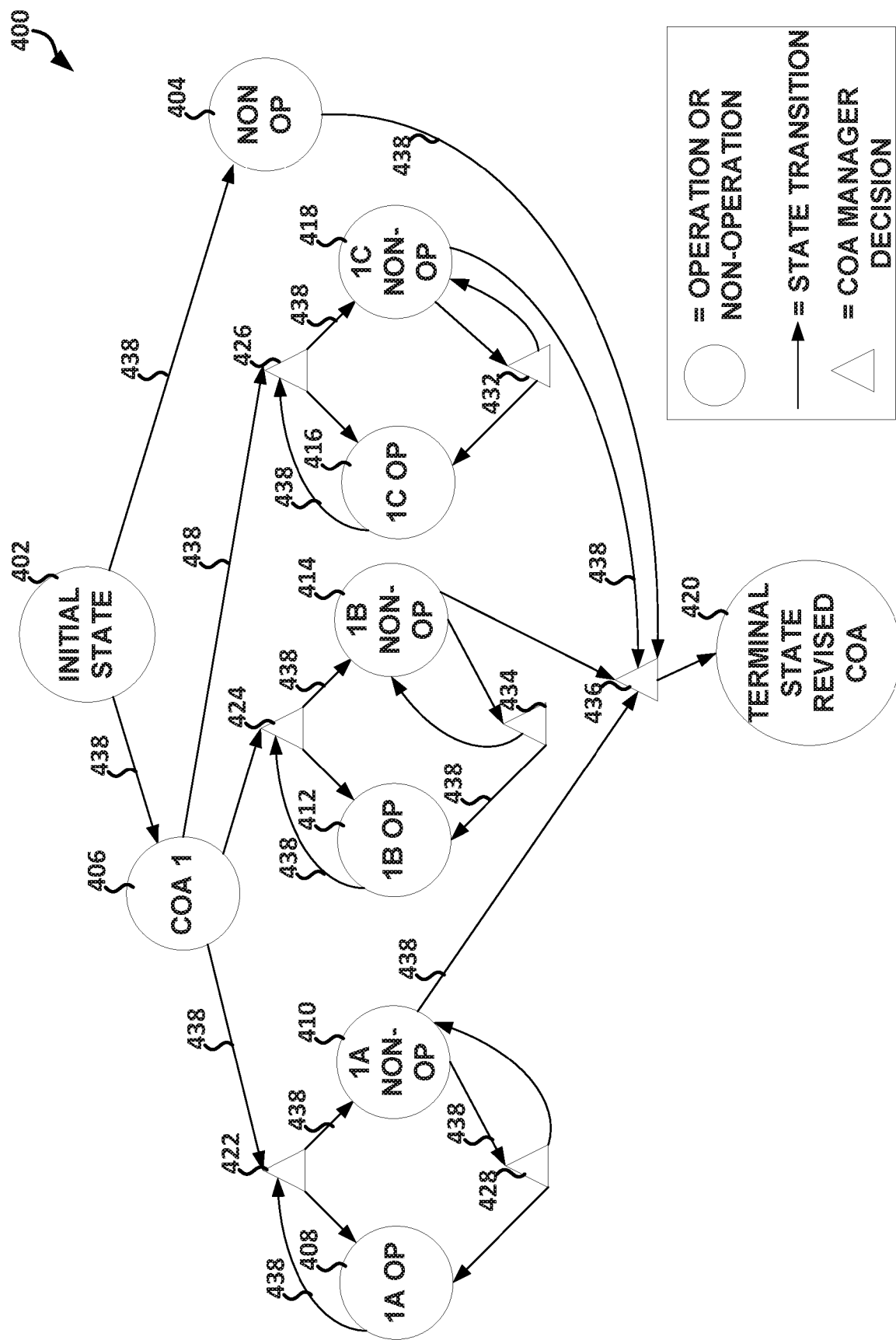
FIG. 4 illustrates, by way of example, a diagram of an embodiment of a COA tree.

FIG. 4 illustrates, by way of example, a diagram of an embodiment of a COA tree 400. Data representing the COA tree 400 can be stored in the databases 220, 222, 224. The COA tree 400 as illustrated includes nodes 402, 404, 406, 408, 410, 412 414, 416, 418, 420 and directed edges 438 (not all edges are labelled so as to not obscure the view of FIG. 4). The nodes 402, 404, 406, 408, 410, 412414, 416, 418, 420 represent operations (actual, functional operations, called "ops" and failed or resting operations called "non-ops") of the COA and the edges 438 represent transitions between operations. The edges 438 include associated probabilities determined based on the SMM.

A decision on whether to transition from a node 402, 404, 406, 408, 410, 412414, 416, 418, 420 to another node 402, 404, 406, 408, 410, 412414, 416, 418, 420 can include using a Markov Decision Process (MDP). The COA manager 102 (see FIG. 1) can implement the MDP process.

An MDP process is a discrete time stochastic control process. It provides a mathematical framework for modeling decision making in situations where outcomes are partly random and partly under the control of a decision maker. MDPs are useful for studying optimization problems solved via dynamic programming and reinforcement learning.

A Markov decision process is a 4-tuple (S, A, $P_a$, $R_a$), where S is a finite set of states, A is a finite set of actions (alternatively, $A_s$ is the finite set of actions available from state, s), $P_a(s, s')=Pr(s_{t+1}=s'|s_t=s, a_t=a)$ is the probability that action a in state s at time t will lead to state s' at time t+1, $R_a(s, s')$ is the immediate reward (or expected immediate reward) received after transitioning from state, s, to state s', due to action a.

At each time step, the process is in some state, s, and the decision maker (the COA manager 102) may choose any action, a that is available in s. The process responds at the next time step by randomly moving into a new state, s', and giving the decision maker a corresponding reward $R_a(s,s')$.

The probability that the process moves into its new state s' is influenced by the chosen action. Specifically, it is given by the state transition function $P_a(s,s')$. Thus, the next state s', depends on the current state, s, and the decision maker's action a. But given s and a, it is conditionally independent of all previous states and actions; in other words, the state transitions of an MDP satisfy the Markov property.

A solution to an MDP is often called a policy. The solution can be determined using dynamic programming, reinforcement learning, or the like. A probability associated with the edge 438 can be determined using SMM. SMM is described in more detail regarding FIG. 5.

FIG. 5 illustrates, by way of example, a diagram of a chart 300 of vulnerability-technique (VT) pairs as can be generated in accordance with some embodiments. The vulnerabilities 504 are ways to affect the target 110. An upper row of vulnerabilities 502 lists the various vulnerabilities 504 that can occur at various phases of a life cycle of the target 110. The illustrated phases include a manufacturing and production phase 506, a test phase 508, a fielding phase 510, and a boost phase 512, although embodiments are not limited to any particular number of phases and phase identifiers are not limited to any particular identifiers. The particular target in FIG. 5 is a missile. Missile design and manufacturing engineers or other experts or computer systems can assess and identify these vulnerabilities.

Column 514 lists various techniques 518 for exploiting and manipulating each vulnerability 502. Cyber-engineers, electronic warfare experts, or other experts or computer systems can identify these techniques 518. The techniques 518 can include cyber weapons, directed energy, electronic warfare, etc. The techniques 518 can be associated with the assets 108A-108D. Cyber weapons can include digital techniques that can disrupt or destroy hardware or software components of a computerized system or network. Directed energy techniques can include targeted electromagnetic pulse (EMP). Electronic warfare techniques can exploit wireless vulnerabilities. The multiple techniques 518 may be independent such that the desired effect is achieved if one or more of the techniques 518 are successfully implemented. Conversely, the multiple techniques 518 may only result in the desired effect when all of the techniques 518 are successfully implemented.

Subject matter experts (SMEs) can then identify one or more VT pairs 516. SMEs can assign a score (not shown in FIG. 5) to each VT pair 516 representing the likelihood that the given technique 518 can exploit the given vulnerability 504. In embodiments, this score includes a judgment based on the experience of the SME. While scoring systems provide a relative ranking for the VT pairs 516 versus a probability of engagement success, apparatuses and methods described herein with respect to various embodiments further allow experts to associate probability distributions, derived as described later herein, with the confidence levels that these experts have in the likelihood that a technique will negate a vulnerability.

A processor 802 (see FIG. 8) can apply an SMM to generate a negation value $P_n$ that represents the probability that a technique 518 of a VT pair 516 will eliminate the threat by exploiting the respective vulnerability 504.

The negation value $P_n$ can be decomposed into several components as described below with reference to Equations (1)-(30). In embodiments, the negation value $P_n$ in Equations (1)-(30) include four components, but other embodiments can include more or fewer components. There is no theoretical limit on the number of components used, but computational time will typically be faster when the negation value $P_n$ includes fewer, rather than more, components. Confidence levels in results may be higher, however, when the negation value $P_n$ includes more, rather than fewer, components.

Each component represents a different criterion or combination of criteria for estimating the probability that implementation of the respective technique 518 will eliminate or effect the target 110 in a manner to satisfy the mission. These criteria can be selected from a list including, but not limited to: a placement criterion to represent whether the asset 108A-108D for executing the technique 518 can be placed in a manner to exploit the vulnerability 504; an activation criterion to represent whether the technique 518 can be activated subsequent to placement of the asset 108A-108D for executing the technique 518; a success criterion to represent whether implementation of the technique 518 can exploit the corresponding vulnerability 504; and a severity criterion to represent the severity with which the vulnerability 504 affects operation of the target 110.

Success can be defined in the context of example embodiments to refer to a measure of whether the technique 518 was performed in a manner in which it was designed to perform. Severity can be defined in the context of example embodiments to refer to a measure of whether the technique 518 had a significant impact on threat performance. For example, a first technique 518 when successful may have the effect of changing the color of a piece of hardware, whereas a second technique 518 when successful causes the hardware to break apart under acoustic loads. Even if the probability of success for each of the first technique 518 and the second technique 518 were the same, the probability of being severe is much higher for the second technique 518 than for the first technique 518. Accordingly, given the same probability of success for each technique 518, the probability of effectiveness would be higher for the second technique 518 than for the first technique 518.

In embodiments, the processor 802 can decompose the negation value $P_n$ according to at least the following equations and principles, sometimes called SMM.

First, it will be appreciated that, in order to eliminate a target 110, a VT pair 516 may be both deployed and effective:

$$P_n = P(e,d) \quad (1)$$

where P(e, d) is the probability of a technique 518 being both deployed d and effective e against a given vulnerability 504. If a technique 518 is not deployed or not effective, then the mission will not be negated, but a new COA may be implemented to handle an unexpected event, such as the non-deployment or ineffective technique 518.

Also, since a technique 518 cannot be effective if it is not deployed:

$$P(e|\sim d) = 0 \quad (2)$$

Likewise:

$$P(\sim e|\sim d) = 1 \quad (3)$$

Therefore:

$$P(e,\sim d) = P(e|\sim d)P(d) = 0 \quad (4)$$

Likewise:

$$P(\sim e,\sim d) = P(\sim e|\sim d)P(\sim d) = P(\sim d) = 1 - P(d) \quad (5)$$

Based on the law of total probability, for a given VT pair, $V_i T_j$:

$$P(d) = P(e,d) + P(\sim e,d) \quad (6)$$

$$P(\sim d) = P(e,\sim d) + P(\sim e,\sim d) = 1 - P(d) \quad (7)$$

$$P(e) = P(e,d) + P(e,\sim d) = P(e,d) = P_n(V_i T_j) \quad (8)$$

$$P(\sim e) = P(\sim e,d) + P(\sim e,\sim d) = 1 - P(e) \quad (9)$$

Applying Bayes' theorem gives:

$$P(e,d) = P(e|d) \times P(d) \quad (10)$$

In turn, for a VT pair 516 to be effective, the technique 518 may be required to be successful su and severe sv:

$$P(e|d) = P(sv,su) \quad (11)$$

Equation (11) signifies that if a VT pair 516 is not successful or not severe, then the VT pair 516 will not be effective given it is deployed.

Also, since a VT pair 516 cannot be severe if it is not successful:

$$P(sv|\sim su) = 0 \quad (12)$$

Likewise:

$$P(\sim sv|\sim su) = 1 \quad (13)$$

Therefore:

$$P(\sim su,sv) = P(sv|\sim su)P(\sim su) = 0 \quad (14)$$

Likewise, $$P(\sim su,\sim sv) = P(\sim sv|\sim su)P(\sim su) = P(\sim su) = 1 - P(su) \quad (15)$$

Based on the law of total probability:

$$P(su) = P(su,sv) + P(su,\sim sv) \quad (16)$$

$$P(\sim su) = P(\sim su,sv) + P(\sim su,\sim sv) = 1 - P(su) \quad (17)$$

$$P(sv) = P(su,sv) + P(\sim su,sv) = P(su,sv) = P(e|d) \quad (18)$$

$$P(\sim sv) = P(su,\sim sv) + P(\sim su,\sim sv) = P(su) - P(su,sv) + 1 - P(su) = 1 - P(su,sv) \quad (19)$$

Applying Bayes' theorem gives:

$$P(e|d) = P(sv|su) \times P(su) \quad (20)$$

Equation (20) signifies that the processor 802 will receive inputs representative of the probability of a VT pair 516 being severe given that it is successful (e.g., P (sv|su)), and the probability of a VT pair 516 being successful (e.g., P(su)). The processor 802 will receive inputs of these probabilities from an SMM, for example, or a computer system, as described in more detail herein with reference to FIG. 5.

Finally, in order for a VT pair 516 to be deployed d, the VT pair 516 must be placed pl and activated a:

$$P(d) = P(a,pl) \quad (21)$$

where P(a, pl) is the probability of a VT pair 516 being both placed and activated, and therefore deployed.

If a VT pair 516 is not placed or not activated, then the VT pair 516 will not be deployed. Also, since a VT pair 516 cannot be activated if it is not placed:

$$P(a|\sim pl) = 0 \quad (22)$$

Likewise:

$$P(\sim a|\sim pl) = 1 \quad (23)$$

Therefore, $$P(a,\sim pl) = P(a|\sim pl)P(\sim pl) = 0 \quad (24)$$

Likewise, $$P(\sim a,\sim pl) = P(\sim a|\sim pl)P(\sim pl) = P(\sim pl) = 1 - P(pl) \quad (25)$$

Based on the law of total probability, $$P(a) = P(a,pl) + P(a,\sim pl) = P(a,pl) = P(d) \quad (26)$$

$$P(\sim a) = P(\sim a,pl) + P(\sim a,\sim pl) = 1 - P(a) = 1 - P(d) \quad (27)$$

$$P(pl) = P(a,pl) + P(\sim a,pl) \quad (28)$$

$$P(\sim pl) = P(a,\sim pl) + P(\sim a,\sim pl) = 1 - P(pl) \quad (29)$$

Applying Bayes' theorem gives:

$$P(d) = P(a|pl) \times P(pl) \quad (30)$$

Equation (30) signifies that the processor 802 will receive inputs representative of the probability of a VT pair 516 being activated given that it is placed (e.g., P(a|pl)) and the probability of a VT pair 516 being placed (e.g., P(pl)). The processor 802 will receive inputs of these probabilities from an SME, for example, or a computer system, as described in more detail herein with reference to FIG. 4.

By combining Equations (10), (20), and (30) for each technique $T_j$ against vulnerability $V_i$, the probability of negation $P_n$ for VT pair $V_i T_j$ can be written:

$$P_n(V_i T_j) = P(sv_{ij}|su_{ij})P(su_{ij}) \times P(a_{ij}|pl_{ij})P(pl_{ij}) \quad (31)$$

The processor 802 can treat each component of Equation (31) as a random variable, with probability distribution functions (PDFs) provided by user input or through automated systems. For example, the processor 802 can treat a first component of Equation (31) as a random variable $RV_1$:

$$RV_1 = sv_{ij}|su_{ij} \quad (32)$$

A PDF for $RV_i$ can be expressed as:

$$f_1(sv_{ij}|su_{ij}) \quad (33)$$

The processor 802 can treat a second component of Equation (31) as a random variable $RV_2$:

$$RV_2 = su_{ij} \quad (34)$$

A PDF for $RV_2$ can be expressed as:

$$f_2(su_{ij}) \quad (35)$$

The processor 802 can treat a third component of Equation (31) as a random variable $RV_3$:

$$RV_3 = a_{ij}|pl_{ij} \quad (36)$$

A PDF for $RV_3$ can be expressed as:

$$f_3(a_{ij}|pl_{ij}) \quad (37)$$

The processor 802 can treat a fourth component of Equation (31) as a random variable $RV_4$:

$$RV_4 = pl_{ij} \quad (38)$$

A PDF for $RV_4$ can be expressed as:

$$f_4(pl_{ij}) \quad (39)$$

The processor 802 can be coupled to a user display device 810 to display graphical representations of the PDFs given by Equations (33), (35), (37) and (39). Each PDF can represent a different confidence level associated with the corresponding component. For example, each PDF represents how confident an SME is in that component. While four components (and PDFs) are shown and described, embodiments are not limited to any particular number of components and PDFs.

The processor 802 can generate any number of negation values $P_n$ based on any number of corresponding VT pairs 516. The processor 802 may combine the negation values $P_n$ in several ways to compute the probability that execution of at least one of the techniques 518 of the plurality of VT pairs 516 will successfully exploit the vulnerability 504 to eliminate or disable the target 110. For example, in some embodiments, several techniques, $T_1, T_2, \ldots, T_m$, can be deployed to exploit a single vulnerability, $V_i$. These techniques 518 may be independent of each other, that is, any one of them, if effective, will negate the target 110. Likewise, the techniques 518 may be highly dependent on one another, that is, the target 110 will only be negated if all of the techniques of a given COA are effective.

The processor 802 can calculate a composite technique, $T_j$, that includes m techniques applied to the vulnerability $V_i$, under the assumption that all of the techniques are independent of one other. Then the composite probability of negation is the probability that all m techniques will not be ineffective, or the probability of at least one technique will be effective:

$$P_n(V_i) = 1 - \Pi_{s=1}^m (1 - P_n(V_i T_s)) \quad (40)$$

The processor 802 can also calculate a composite technique, $T_j$, comprised of m techniques applied to the vulnerability $V_i$, under the assumption that all of the techniques 518 are dependent on one other. Then the composite probability of negation is the probability that all m techniques 518 are effective:

$$P_n(V_i) = \Pi_{s=1}^m P_n(V_i T_s) \quad (41)$$

Likewise, if techniques 518 against q different vulnerabilities 502 must be effective to negate the target 110, then the processor 802 calculates the overall probability of negation according to:

$$P_n = \Pi_{t=1}^q P_n(V_t) \quad (42)$$

Finally, if techniques against q different vulnerabilities are deployed such that any one of them can negate the target 110, then the processor 802 can calculate the overall probability of negation according to:

$$P_n = 1 - \Pi_{t=1}^q (1 - P_n(V_t)) \quad (43)$$

In each of Equations (41)-(43), $P_n(V_i T_s)$ is calculated using Eq 31.

In reality, the actual case could be a combination of dependent and independent techniques against a single vulnerability and several dependent and independent vulnerabilities against a certain missile.

After the processor 802 has received the appropriate PDFs for each outcome for each VT pair 516, the processor 802 or other system such as simulator, can model a "kill chain," where a kill chain defines each step of the target 110 cycle where the target 110 may be negated (i.e., "killed"). For example, the kill chain could include the following steps: system engineering design, supply chain, manufacturing, quality assurance, operations and maintenance, fielding and deployment, and flight (e.g., boost, mid-course, terminal), or any other steps. The processor 802 can use the model to determine the correct composite form for Equations (31) and (41)-(43) for a specific missile under attack and specific VT pairs 516. The processor 802 can execute the model using random numbers or other values from the PDFs that were provided to the processor 802. The processor 802 can combine PDFs to determine probability of eliminating the missile threat using the corresponding technique, wherein the combining can include performing a logical AND operation, a logical OR operation, or both a logical AND and a logical OR operation. The processor 802 can combine the PDFs using at least two combination methods, each of the at least two combination methods including different combinations of logical operations, and the processor 802 can provide a sensitivity analysis that compares probabilities using at least two combination methods.

The processor 802 can calculate various values or generate other data, for example the processor 802 can calculate the mean and confidence interval for $P_n$, as well as the PDF for $P_n$. The processor 802 can determine which parameters are driving to determine the sensitivity of each element on $P_n$. Operators or governmental agencies can use the models, data, and calculations generated using methods and apparatuses in accordance with various embodiments to make a determination to perform additional research into vulnerabilities, techniques, etc.

While some embodiments are described with respect to input devices, some embodiments allow for selection to be performed in an automated fashion by the processor 802, instead of or in addition to being performed through a user input. The selection provides an indication of the confidence level associated with the corresponding component to generate a set of selected PDFs. The processor 802 will combine selected PDFs to determine probability of eliminating the missile threat using the corresponding technique. The processor 802 may perform this combination according to various methods, including by performing a logical AND operation, a logical OR operation, or both a logical AND and a logical OR operation, although embodiments are not limited thereto. In some embodiments, the processor 802 may combine the PDFs using at least two combination methods, each of the at least two combination methods including different combinations of logical operations, to perform a sensitivity analysis to compare probabilities using each of the at least two combination methods.

Figure 6:
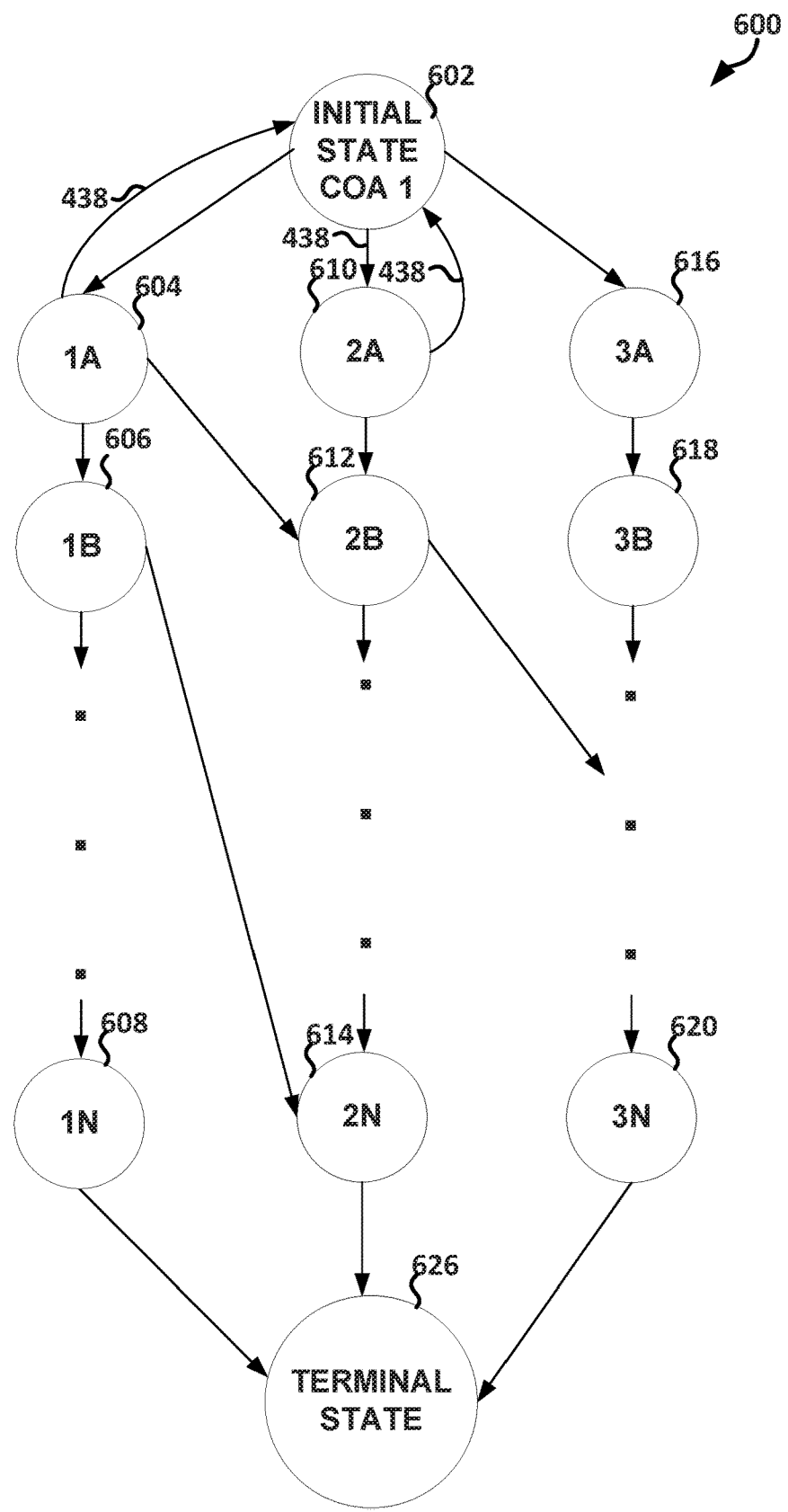
FIG. 6 illustrates, by way of example, a diagram of an embodiment of a COA tree that includes multiple COAs.

FIG. 6 illustrates, by way of example, a diagram of an embodiment of a COA tree 600 that includes multiple COAs. The COA tree 600 is similar to the COA tree 400 in that it includes operations represented by nodes and edges 438 that represent transitions between operations. Each edge can include an associated probability. The operations of COA tree 600 include operations of three COAs, COA 1, COA 2, and COA 3. The nodes 604, 606, 608 represent operations of COA 1. The nodes 610, 612, 614 represent operations of COA 2. The operations 616, 618, 620 represent operations of COA 3. As previously discussed, the edges 438 represent transitions between the operations on each end of the edge 438.

To determine a probability for an edge, SMM can be used. To determine a probability associated with moving along a COA, the mean and standard deviations of the probabilities of the two or more operations can be added. To determine a probability associated with moving from one COA another to another one or more COAs, the means and standard deviations can be multiplied.

Assume there are three random variables $x_1$, $x_2$, $x_3$ with mean $\mu_1$, $\mu_2$, $\mu_3$ and standard deviations $\sigma_1$, $\sigma_2$, $\sigma_3$. Each of these random variables $x_1$, $x_2$, $x_3$ represents a unique COA operation. For random variables that are part of a same COA, the means and standard deviations can be added to determine a mean and standard deviation for the random variable representing the multiple operations. In mathematical terms, $x_{12}=x_1+x_2$, $\mu_{12}=\mu_1+\mu_2$, $\sigma_{12}=\mathrm{sqrt}(\sigma_1+\sigma_2)$. This is easily extendable to three or more variables.

For random variables that are part of different paths (different COAs), the random variables can be multiplied. The resulting random variable for switching from one path to another, $x_{12}=x_1*x_2$ includes a mean, variance, and standard deviation as follows: $\mu_{12}=\mu_1*\mu_2$, $\sigma^2_{12}=(\mu^2_1*\sigma^2_2)+(\mu^2_2*\sigma^2_1)\pm(\sigma^2_1*\sigma^2_2)$, $\sigma_{12}=\mathrm{sqrt}(\sigma^2_{12})$.

To extend to random variables that are part of three different paths, the random variables can likewise be multiplied. The resulting mean, variance, and standard deviation of such a random variable, $x_{123}=x_1*x_2*x_3$, are as follows: $\mu_{123}=\mu_1*\mu_2*\mu_3$, $\sigma^2_{123}=(\mu^2_1*\mu^2_2*\sigma^2_3)+(\mu^2_1*\sigma^2_2*\mu^2_3)+(\mu^2_1*\sigma^2_2*\sigma^2_3)+(\sigma^2_1*\mu^2_2*\mu^2_3)+(\sigma^2_1*\mu^2_2*\sigma^2_3)+(\sigma^2_1*\sigma^2_2*\mu^2_3)+(\sigma^2_1*\sigma^2_2*\sigma^2_3)$, $\sigma_{123}\mathrm{sqrt}(\sigma^2_{123})$.

For a constant, K, added to the random variable, x+K, the mean shifts by K and the standard deviation remains unchanged from the standard deviation of the random variable. The new mean is $\mu+K$. For a constant, K, multiplied by the random variable, x*K, the mean and standard deviation are scaled by K. The new mean and standard deviation are $\mu*K$ and $\sigma*K$.

The following discussion regards how to determine probability of success and confidence interval using a binomial distribution, however, a different distribution, such as a beta distribution or other distribution, can be used. When using a binomial distribution to determine success or failure, the standard deviation can be given by $\sigma=\mathrm{SQRT}(N*p*(1-p))$ where N is the number of trials/runs and p is the mean probability. When determining the probability of success, $p_{succ}$, for multiple COA activities, the mean probability of success can be calculated by as follows:

$\mu=1-(1-p)^N$ where N is the number of COA operations and p is the mean probability of success for a single COA operation. The mean for five COA activities is thus $\mu=1-(1-p)^5$. The probability that at least one COA activity of the activities is successful is the same as the mean for multiple COA activities, namely, $p_{succ}=1-(1-p)^N$.

The confidence interval for the probability of success can be based on the standard deviation for the binomial distribution. The standard deviation of the binomial distribution is $\mathrm{SQRT}(N*\mu*(1-\mu))/N$, where N is the number of trials and $\mu$ is the mean probability of success.

The confidence interval for the probability of success can be based on the standard deviation for the binomial distribution. The standard deviation of the binomial distribution is $\mathrm{SQRT}(N*\mu*(1-\mu))/N$, where N is the number of trials and $\mu$ is the mean probability of success. When calculating the confidence interval for multiple COA activities, calculate the mean (which is equal to the probability of success of one of the COA operations), $\mu$, first for the given number of COA activities, then use that number to determine the confidence interval, which is equal to the standard deviation. In this example, the confidence interval=$\mathrm{SQRT}(5*\mu*(1-\mu))/5$.

Figure 7:
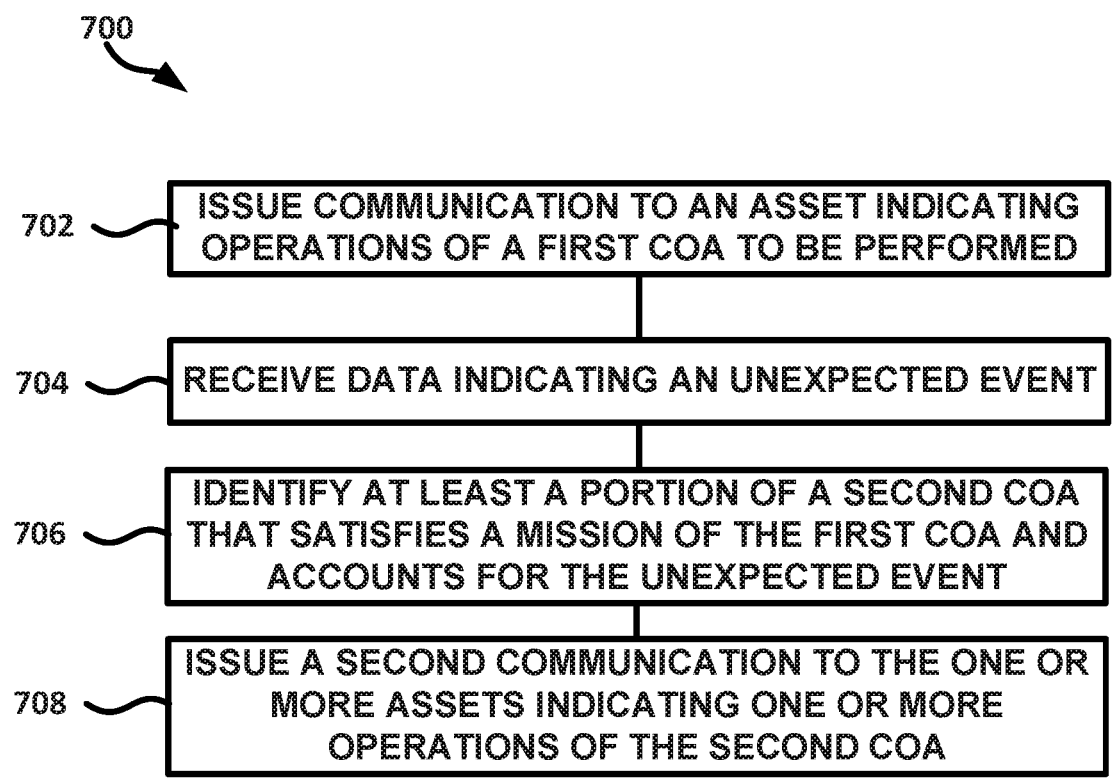
FIG. 7 illustrates, by way of example, a diagram of an embodiment of a method for autonomous correction of a COA.

FIG. 7 illustrates, by way of example, a diagram of an embodiment of a method 700 for autonomous correction or generation of a COA. The method 700 can be implemented using one or more of the components and devices of FIGS. 1 and 8. The method 700 as illustrated includes issuing a communication to one or more assets indicating operations of a first COA to be performed, at operation 702; receiving (by an ISR device 106 and/or while the operations of the first COA are being performed) data indicating an unexpected event, not accounted for in the first COA, has occurred; in response to the data indicating the unexpected event, identifying a second COA or a portion of a second COA that satisfies a mission of the first COA and accounts for the unexpected event, at operation 706; and issuing a second communication to the one or more assets indicating one or more operations of the second COA to be performed (in lieu of the operations of the first COA), at operation 708.

The method 700 can further include, wherein the data indicates the unexpected event is received while the first COA is being performed. The method 700 can further include generating or receiving a first COA tree and a second COA tree, each tree including operations of assets as nodes and edges between nodes representing relationships between operations of assets. The method 700 can further include, wherein generating the first and second COA trees includes using a Markov Decision Process (MDP) for COA assessment.

The method 700 can further include determining a probability of success and confidence interval for each operation of the operations. The method 700 can further include associating the probability of success with an associated branch of the COA tree. The method 700 can further include, wherein determining the probability of success includes using a stochastic mathematical model of the operation.

The method 700 can further include, wherein determining the probability of success and confidence interval includes determining a mean and standard deviation of a statistical distribution representing the COA operations. The method 700 can further include propagating the probability of success and confidence interval across COA operations of the first and second COAs by determining mathematical combinations of respective means and standard deviations of respective branches of the first and second COA trees. The method 700 can further include comparing the probability of success and confidence interval of operations of the first COA to a threshold probability of success and confidence interval. The method 700 can further include altering the first COA in response to determining the probability of success and confidence interval are below the threshold probability of success and confidence interval. The method 700 can further include, wherein the unexpected event includes attrition of an asset of the assets or arrival of a new adversary asset.

Figure 8:
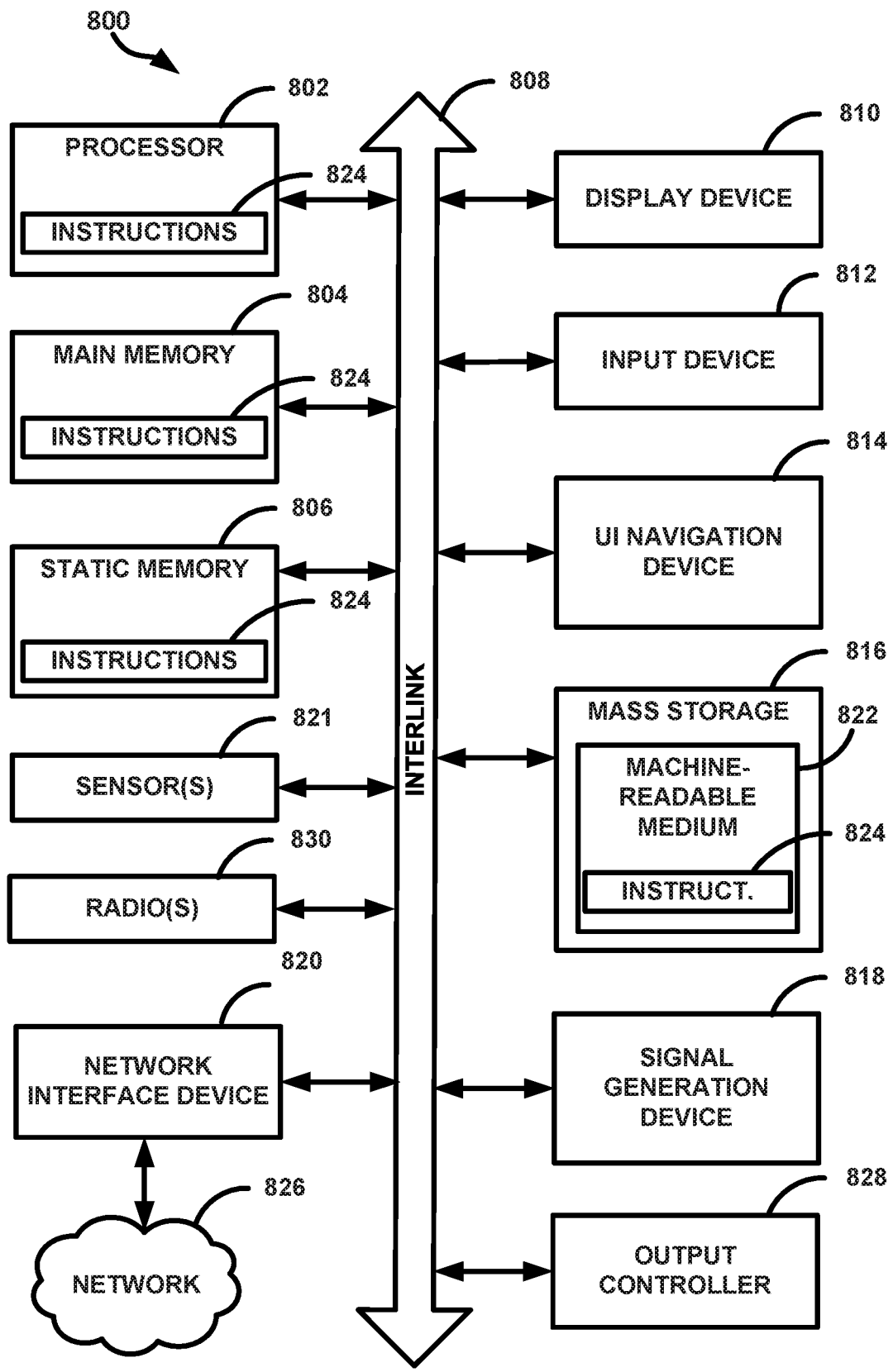
FIG. 8 illustrates, by way of example, a block diagram of an embodiment of a machine in the example form of a computer system within which instructions, for causing the machine to perform any one or more of the methodologies discussed herein, may be executed.

FIG. 8 illustrates, by way of example, a block diagram of an embodiment of a machine in the example form of a computer system 800 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a mass storage unit 816, a signal generation device 818 (e.g., a speaker), a network interface device 820, and a radio 830 such as Bluetooth, WWAN, WLAN, and NFC, permitting the application of security controls on such protocols.

The mass storage unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 can include a computer-implemented method for autonomous, dynamic course of action (COA) generation and management, the method comprising issuing a communication to one or more assets indicating operations of a first COA to be performed, receiving, by an intelligence, surveillance, and reconnaissance (ISR) device, data indicating an unexpected event, not accounted for in the first COA, has occurred, in response to the data indicating the unexpected event, identifying a second COA or a portion of a second COA that satisfies a mission of the first COA and accounts for the unexpected event, and issuing a second communication to the one or more assets indicating one or more operations of the second COA to be performed.

In Example 2, Example 1 can further include, wherein the data indicating the unexpected event is received while the first COA is being performed, the method further comprising generating or receiving a first COA tree and a second COA tree, each tree including operations of assets as nodes and edges between nodes representing relationships between operations of assets.

In Example 3, Example 2 can further include, wherein generating the first and second COA trees includes using a Markov Decision Process (MDP) for COA assessment.

In Example 4, at least one of Examples 2-3 can further include determining a probability of success and confidence interval for each operation of the operations and associating the probability of success with an associated branch of the COA tree.

In Example 5, Example 4 can further include, wherein determining the probability of success includes using a stochastic mathematical model of the operation.

In Example 6, Example 5 can further include, wherein determining the probability of success and confidence interval includes determining a mean and standard deviation of a statistical distribution representing the COA operations.

In Example 7, Example 6 can further include propagating the probability of success and confidence interval across COA operations of the first and second COAs by determining mathematical combinations of respective means and standard deviations of respective branches of the first and second COA trees.

In Example 8, at least one of Examples 4-7 can further include comparing the probability of success and confidence interval of operations of the first COA to a threshold probability of success and confidence interval and altering the first COA in response to determining the probability of success and confidence interval are below the threshold probability of success and confidence interval.

In Example 9, at least one of Examples 1-8 can further include, wherein the unexpected event includes attrition of an asset of the assets or arrival of a new adversary asset.

Example 10 can include a machine-readable medium including instructions that, when executed by a machine, cause the machine to perform the method of at least one of Examples 1-9.

Example 11 can include a device that includes a memory with COA data (e.g., data representing one or more COA trees that represents operations of one or more respective COAs) stored thereon and processing circuitry configured to implement the method of at least one of Examples 1-9.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for autonomous, dynamic course of action (COA) generation and management, the method comprising:
    issuing a communication to one or more assets indicating operations of a first COA to be performed;
    receiving, by an intelligence, surveillance, and reconnaissance (ISR) device, data indicating an unexpected event, not accounted for in the first COA, has occurred;
    in response to the data indicating the unexpected event, identifying a second COA or a portion of a second COA that satisfies a mission of the first COA and accounts for the unexpected event; and
    issuing a second communication to the one or more assets indicating one or more operations of the second COA to be performed.

2. The method of claim 1, wherein the data indicating the unexpected event is received while the first COA is being performed, the method further comprising:
    generating or receiving a first COA tree and a second COA tree, each tree including operations of assets as nodes and edges between nodes representing relationships between operations of assets.

3. The method of claim 2, wherein generating the first and second COA trees includes using a Markov Decision Process (MDP) for COA assessment.

4. The method of claim 2, further comprising determining a probability of success and confidence interval for each operation of the operations and associating the probability of success with an associated branch of the COA tree.

5. The method of claim 4, wherein determining the probability of success includes using a stochastic mathematical model of the operation.

6. The method of claim 5, wherein determining the probability of success and confidence interval includes determining a mean and standard deviation of a statistical distribution representing the COA operations.

7. The method of claim 6, further comprising propagating the probability of success and confidence interval across COA operations of the first and second COAs by determining mathematical combinations of respective means and standard deviations of respective branches of the first and second COA trees.

8. The method of claim 4, further comprising:
    comparing the probability of success and confidence interval of operations of the first COA to a threshold probability of success and confidence interval and altering the first COA in response to determining the probability of success and confidence interval are below the threshold probability of success and confidence interval.

9. The method of claim 1, wherein the unexpected event includes attrition of an asset of the assets or arrival of a new adversary asset.

10. A non-transitory machine-readable medium including instructions that, when executed by a machine, cause the machine to perform operations for autonomous, dynamic course of action (COA) generation and management, the operations comprising:
    issuing a communication to one or more assets indicating operations of a first COA to be performed;
    receiving, by an intelligence, surveillance, and reconnaissance (ISR) device, data indicating an unexpected event, not accounted for in the first COA, has occurred;
    in response to the data indicating the unexpected event, identifying a second COA or a portion of a second COA that satisfies a mission of the first COA and accounts for the unexpected event; and
    issuing a second communication to the one or more assets indicating one or more operations of the second COA to be performed.

11. The non-transitory machine-readable medium of claim 10, wherein the data indicating the unexpected event is received while the first COA is being performed, and the operations further comprise:
    generating or receiving a first COA tree and a second COA tree, each tree including operations of assets as nodes and edges between nodes representing relationships between operations of assets.

12. The non-transitory machine-readable medium of claim 11, wherein generating the first and second COA trees includes using a Markov Decision Process (MDP) for COA assessment.

13. The non-transitory machine-readable medium of claim 11, wherein the operations further comprise determining a probability of success and confidence interval for each operation of the operations and associating the probability of success with an associated branch of the COA tree.

14. The non-transitory machine-readable medium of claim 13, wherein determining the probability of success includes using a stochastic mathematical model of the operation.

15. The non-transitory machine-readable medium of claim 14, wherein determining the probability of success and confidence interval includes determining a mean and standard deviation of a statistical distribution representing the COA operations.

16. The non-transitory machine-readable medium of claim 15, wherein the operations further comprise propagating the probability of success and confidence interval across COA operations of the first and second COAs by determining mathematical combinations of respective means and standard deviations of respective branches of the first and second COA trees.

17. A device configured for autonomous, dynamic course of action (COA) generation and management, the device comprising:
    a memory including data of a first COA tree representing operations of a first COA stored thereon;
    processing circuitry coupled to the memory, the processing circuitry configured to:
        issue a communication to one or more assets indicating operations of the first COA to be performed;

receiving, by an intelligence, surveillance, and reconnaissance (ISR) device, data indicating an unexpected event, not accounted for in the first COA, has occurred;

in response to the data indicating the unexpected event, identify or generating a second COA tree or a portion of a second COA tree representing operations of a second COA that satisfy a mission of the first COA and accounts for the unexpected event; and issue a second communication to the one or more assets indicating one or more operations of the second COA to be performed.

18. The device of claim 17, wherein the data indicating the unexpected event is received while the first COA is being performed, and the processing circuitry is further configured to generate or receive a first COA tree and a second COA tree, each tree including operations of assets as nodes and edges between nodes representing relationships between operations of assets.

19. The device of claim 18, wherein the processing circuitry is further configured to determine a probability of success and confidence interval, using a stochastic mathematical model, for each operation of the operations and associate the probability of success with an associated branch of the COA tree.

20. The device of claim 19, wherein determining the probability of success and confidence interval includes determining a mean and standard deviation of a statistical distribution representing the COA operations and the processing circuitry is further configured to propagate the probability of success and confidence interval across COA operations of the first and second COAs by determining mathematical combinations of respective means and standard deviations of respective branches of the first and second COA trees.

\* \* \* \* \*